United States Patent
Schaefer

(10) Patent No.: US 9,475,259 B2
(45) Date of Patent: Oct. 25, 2016

(54) COMPOSITE MATERIAL

(75) Inventor: Philipp Schaefer, Hannover (DE)

(73) Assignee: Konrad Hornschuh AG, Weissbach (DE)

( * ) Notice: Subject to any disclaimer, the term of this patent is extended or adjusted under 35 U.S.C. 154(b) by 495 days.

(21) Appl. No.: 13/991,287

(22) PCT Filed: Dec. 1, 2011

(86) PCT No.: PCT/EP2011/006028
§ 371 (c)(1),
(2), (4) Date: Jun. 3, 2013

(87) PCT Pub. No.: WO2012/072225
PCT Pub. Date: Jun. 7, 2012

(65) Prior Publication Data
US 2013/0273309 A1   Oct. 17, 2013

(30) Foreign Application Priority Data

Dec. 2, 2010 (AT) ................................ GM742/2010
Apr. 7, 2011 (DE) .................... 20 2011 004 994 U

(51) Int. Cl.
*B32B 5/18* (2006.01)
*B32B 5/14* (2006.01)
(Continued)

(52) U.S. Cl.
CPC . *B32B 5/18* (2013.01); *B32B 3/10* (2013.01); *B32B 3/12* (2013.01); *B32B 3/26* (2013.01);
(Continued)

(58) Field of Classification Search
CPC ......... B32B 5/028; B32B 5/145; B32B 5/18; B32B 5/24; B32B 5/245; B32B 5/26; B32B 5/28; B32B 7/12; B32B 27/12; B32B 27/40; B32B 3/26; B32B 7/02; B32B 5/024; B32B 5/022; B32B 3/10; B32B 3/12; B32B 5/14; B32B 27/065; B32B 2260/046; B32B 2605/08; B32B 2605/003; B32B 2307/51; B32B 2307/724; B32B 2266/06; B32B 2451/00; B32B 2307/304; B32B 2307/102; B32B 2260/021; B32B 2266/0278; Y10T 442/332; Y10T 442/647; Y10T 428/249985; Y10T 428/249982; Y10T 428/24165; Y10T 428/24331; Y10T 428/24967; Y10T 428/24851
USPC ............. 428/218, 306.6, 308.4, 317.1, 317.9
See application file for complete search history.

(56) References Cited

U.S. PATENT DOCUMENTS 4,221,619 A * 9/1980 Lemons .................... B63B 3/68
156/306.9
6,204,209 B1    3/2001 Rozek et al.
(Continued)

FOREIGN PATENT DOCUMENTS

DE    20 2010 009 073 U1    8/2010
EP           0 949 066 A2    10/1999
(Continued)

*Primary Examiner* — Elizabeth M Cole
(74) *Attorney, Agent, or Firm* — Laurence A. Greenberg; Werner H. Stemer; Ralph E. Locher

(57) ABSTRACT

A composite material has a polymeric upper layer which is connected via at least one adhesive layer to a substrate. The substrate is predominantly or entirely formed by an open-cell polyurethane foam onto which the upper layer, containing between 2 and 12 wt % of polysiloxane, is bonded by an adhesive layer. An intermediate layer or a double layer, i.e. a composite of the intermediate layer with a bonding layer located between the substrate and the intermediate layer, is provided between the upper layer and the substrate as the adhesive layer for joining the upper layer and the substrate. The regions of the substrate into which the polyurethane dispersion of the adhesive layer has penetrated in a controlled manner during application have a density which is between 12% and 48%, above the density of the regions of the substrate without the adhesive layer.

17 Claims, 3 Drawing Sheets

(51) Int. Cl.

| | | |
|---|---|---|
| *B32B 5/24* | (2006.01) | |
| *B32B 5/28* | (2006.01) | |
| *B32B 27/06* | (2006.01) | |
| *B32B 27/12* | (2006.01) | |
| *B32B 27/40* | (2006.01) | |
| *B32B 3/10* | (2006.01) | |
| *B32B 3/12* | (2006.01) | |
| *B32B 3/26* | (2006.01) | |
| *B32B 5/02* | (2006.01) | |
| *B32B 7/02* | (2006.01) | |
| *B32B 7/12* | (2006.01) | |

(52) U.S. Cl.
CPC ............... *B32B 5/022* (2013.01); *B32B 5/024* (2013.01); *B32B 5/028* (2013.01); *B32B 5/14* (2013.01); *B32B 5/245* (2013.01); *B32B 5/28* (2013.01); *B32B 7/02* (2013.01); *B32B 7/12* (2013.01); *B32B 27/065* (2013.01); *B32B 27/12* (2013.01); *B32B 27/40* (2013.01); *B32B 2260/021* (2013.01); *B32B 2260/046* (2013.01); *B32B 2266/0278* (2013.01); *B32B 2266/06* (2013.01); *B32B 2307/102* (2013.01); *B32B 2307/304* (2013.01); *B32B 2307/51* (2013.01); *B32B 2307/724* (2013.01); *B32B 2451/00* (2013.01); *B32B 2605/003* (2013.01); *B32B 2605/08* (2013.01); *Y10T 428/24165* (2015.01); *Y10T 428/24331* (2015.01); *Y10T 428/24851* (2015.01); *Y10T 428/24967* (2015.01); *Y10T 428/249982* (2015.04); *Y10T 428/249985* (2015.04); *Y10T 442/10* (2015.04); *Y10T 442/3325* (2015.04); *Y10T 442/647* (2015.04)

(56) References Cited

U.S. PATENT DOCUMENTS

| | | |
|---|---|---|
| 8,426,022 B2 | 4/2013 | Schaefer |
| 2013/0089718 A1 | 4/2013 | Schaefer et al. |

FOREIGN PATENT DOCUMENTS

| | | |
|---|---|---|
| WO | 2009049728 A2 | 4/2009 |
| WO | 2010139710 A1 | 12/2010 |

* cited by examiner

COMPOSITE MATERIAL

This application is a 371 of PCT/EP11/06028 filed Dec. 1, 2011.

BACKGROUND OF THE INVENTION

Field of the Invention

The invention concerns a composite material as claimed. Such composite materials are made in the form of flexible cut blanks or shape parts in the form of sheets, plates or webs.

Composite materials generally have a multilayered construction and have an upper layer formed with a polyurethane dispersion on their surface, which is connected by adhesive layers and/or intermediate layers to a substrate, e.g., one of leather or textile.

DE-GM 20 2004019330 U1 describes a coating made from polyurethane dispersions that are surface-structurized by means of a silicone matrix. The coating is situated on a leather roughened by grinding or on a roughened textile substrate.

The aim of the invention is to form a composite material, in particular such that this composite material has very low weight and is soundproof, thermally insulating, and compression-elastic. Furthermore, objects prepared from such composite materials should ensure a pleasant feel, good appearance and the utmost comfort to the touch and in use, especially for interior ceiling linings of automobiles in particular. Moreover, the goal is to create a composite material that has a favorable $CO_2$ balance both in its manufacture and in use.

The problem also includes avoidance of water of condensation forming between the metal roof of the automobile and the ceiling, caused by climate changes and humidity.

It is also a problem for the light, voluminous substrate to not be prone to layer separation, and to have any desired surface appearance, especially grain leather, suede leather, technical fabrics, such as those made from carbon fibers or having a fine structure, such as a high-quality textile, such as silk.

The problem also includes the composite material being easy to recycle in environmentally friendly manner, i.e., without large $CO_2$ release, as opposed to leather or heavy imitation leathers.

BRIEF SUMMARY OF THE INVENTION

According to the invention, these problems are solved when the substrate is formed for the most part or entirely with an open-cell polyurethane foam, onto which the upper layer is bonded. Advantageously, the foam is formed by peeling or cleaving from a foam block, so that the foam or the resulting foam web has no closed skin on either side, such as necessarily arises in the manufacture of a molded foam piece.

A composite material according to the invention is characterized primarily in that it is flexible and very compression-elastic, as well as extremely light and has an easily structurized surface, one which is tough, bendable or easily shaped and has a pleasant outer appearance.

An especially light and flexible or compression-elastic composite material is obtained when the fraction of open cells in the polyurethane foam of the substrate is greater than 90%. This material is also correspondingly permeable to air and water vapor. It is advantageous for it to be a peeled or cloven foam and for the weight of the polyurethane foam used as the substrate to be 15 to 110 kg/m$^3$, preferably 30 to 85 kg/m$^3$. Depending on the desired purpose of use, the weight of the polyurethane foam can be varied, the foam itself belonging to the group of soft polyurethane foams, and it can be made of polyester or polyether.

For the connecting of the upper layer to the substrate, depending on the purpose of use and the desired properties, an intermediate layer or a double layer or a composite of an intermediate layer with a bonding layer located between the substrate and the intermediate layer can be provided as an adhesive layer between the upper layer and the substrate for the connection of upper layer and intermediate layer.

In particular, in the case of light polyurethane foams, it can be advantageous for strengthening purposes to insert or embed a thin, lightweight netting, woven or nonwoven fabric in the adhesive layer, and/or to place the netting or woven or nonwoven fabric on the surface of the substrate and bond it to the surface of the substrate, preferably by flame lamination. Good weight and strength is generally obtained when the basis weight of the woven or nonwoven fabric or netting is 15 to 120 g/m$^2$, preferably 30 to 80 g/m$^2$, and/or when the spacings between the threads or yarns of the netting or woven or nonwoven fabric or the longest dimensions of the voids or meshes located between the threads or yarns are 0.02 to 2.5 mm, preferably 0.05 to 1.5. The woven or nonwoven fabrics or nettings can be made from threads or yarns of polyester or polyamide and also contain cotton fibers.

Good strength and elasticity are achieved when the intermediate layer or the bonding layer, optionally an inserted woven or nonwoven fabric or netting or one bonded to the substrate, is introduced or penetrated at least partially penetrating 0.02 to 0.8 mm, preferably 0.05 to 0.5 mm into the open-cell polyurethane foam of the substrate.

Depending on the application purpose, it can be advantageous for the thickness of the substrate to be 1.0 to 5 mm, preferably 1.5 to 3.5 mm.

An appropriate firm construction with very good pressure elasticity and an optimal surface configuration results when the upper layer is directly bonded or glued to the substrate, i.e., without insertion of a layer of woven or nonwoven fabric or netting, with an adhesive layer containing a solidified polyurethane dispersion or formed from this.

A tough construction of the upper layer with adjustable properties and very good abrasion behavior is accomplished when the upper layer is formed from a polyurethane dispersion having elastomeric or thermoelastic properties even without cross-linking agents, and when it contains more than 4 wt. % of non-migratable polysiloxane and/or when the polyurethane dispersion has a branched structure, and/or when the composite material is constructed with two inseparably joined layers and comprises an upper layer having an outer, surface structurized, solidified polyurethane dispersion and an intermediate layer situated below it, preferably one having pronounced thermoplastic properties before its cross-linking, and preferably having a linear structure.

Thanks to having the upper layer formed from two layers bonded together it is easily possible to provide the layer situated at the surface with a pattern that is dictated by a matrix, such as a matrix of silicone rubber or by coated paper, and to bond this patterned layer to the substrate. The intermediate layer serves to connect the upper layer firmly and inseparably to the bonding layer or directly to the substrate.

It is advantageous for the upper layer to have a thickness of 0.04 to 0.14 mm, preferably 0.08 to 0.11 mm, and/or for the intermediate layer to have a thickness of 0.04 to 0.11 mm, preferably 0.06 to 0.08 mm. With these specifications, one obtains an elastic, stretchable composite material whose surface remains intact even under bending stresses or strains of more than 40%.

The upper layer can be formed on a directly or indirectly created matrix or underlayment, especially a silicone rubber matrix, which has been given a corresponding surface configuration by molding a desired surface, such as that of a carbon fabric, a grain leather, or a laser treated surface, and which is transferred to the surface of the upper layer.

In the production of the composite material, an upper layer containing an aqueous polyurethane dispersion is deposited onto a surface-structurized, heated or hot matrix or a coated paper, an intermediate layer is applied to this upper layer after it dries or is somewhat dried, and the substrate is applied directly to the still moist intermediate layer, or the substrate provided with the bonding layer, optionally with a ply of a netting or a woven or a nonwoven fabric embedded in the bonding layer or bonded to the substrate, while the intermediate layer or the bonding layer are each still in the moist state and the layers placed one on top of the other are joined to form the plate or web shaped composite material by pressing together.

To achieve a good connection of the upper layer and the intermediate layer, the upper layer can be formed on the heated matrix or the heated, structurized paper and left to dry or start drying there. The intermediate layer can be placed on this not yet cross-linked but already dried upper layer. The substrate is then applied directly to the still slightly moist intermediate layer or the substrate provided with the bonding layer in the still moist state of the bonding layer, and subjected to pressure by a roller.

When no woven or nonwoven fabric or netting is provided, the substrate with no prior adhesive coating can be placed directly in or on the wet intermediate layer and slightly pressed with a roller so that the adhesive penetrates into the surface of the substrate in a controlled way.

One thus achieves a firm connection of the individual layers, and the upper layer is given a corresponding appearance on its surface thanks to the corresponding configuration of the matrix surface.

It is expedient and advantageous for cross-linking agents to be contained in the upper layer and in the intermediate layer and in the bonding layer and for the upper layer to be cross-linked together with the intermediate layer and/or the intermediate layer with the bonding layer by joining together in the still moist state and/or for up to 4 wt. % of transparent plastic hollow microspheres to be contained in the upper layer and/or in the intermediate layer and/or for pigments, cross-linking agents and/or thickeners to be contained in the polyurethane dispersions and/or to form fine hairs on the upper layer and/or to form continuous capillaries in the upper layer and/or for the surface to have an appearance resembling suede leather or a ground plastic material with a fine-cell structure or a microfine hexagonal honeycomb structure.

Firm, strong, stretchable format blanks adapted to the stresses of use are obtained when the solidified polyurethane dispersion of the upper layer contains, besides pigments, between 2 and 12 wt. % of polysiloxane and is cross-linked and/or when the polyurethane dispersions for the intermediate layer and the bonding layer are largely similar or identical in their composition and contain up to 55 wt. % of polyacrylate and are cross-linked.

To achieve appropriate lightness while at the same time ensuring good adhesion properties, advantageously the intermediate layer or the bonding layer has a basis weight of 20 to 100 $g/m^2$, preferably 25 to 80 $g/m^2$, and each is a layer of a solidified aqueous polyurethane dispersion, optionally containing polyacrylates and/or synthetic resins, each having preferably the same or a very similar chemical makeup, and/or the regions of the substrate into which the polyurethane dispersion of the adhesive layer has penetrated in controlled manner while being applied have a density which is between 12% and 48%, preferably 18% and 30%, above the density of the regions of the substrate that are free of adhesive.

The polyurethane dispersion adhesive of the intermediate layer or bonding layer serving as the adhesive layer can be well anchored in the open cells of the polyurethane foam of the substrate. The interstices and cavities of an inserted woven or nonwoven fabric or netting can be easily penetrated by the adhesive mass, in areas or if desired entirely.

In order to adapt a composite material of the invention to different conditions of use, a backing layer preferably made of textile material, cardboard, paper, plastic film or a polyester or polyamide nonwoven can be attached to the surface of the substrate facing away from the upper layer, preferably by gluing or by flame lamination.

It is also possible to apply a very thin, hydrophobic finish layer to the surface of the upper layer in a thickness of less than 0.005 mm, which optionally contains nano-particles of polysiloxane or wax or fluoropolymers or mixtures of these and/or the upper layer can be a surface-structurized layer containing a solidified polyurethane dispersion and formed on a structurized paper or a structurized matrix or silicone rubber underlayment or form.

Since the substrate is easily bendable and elastically deformable, it can be advantageous to impart these properties to the composite material of the invention as well, for which the upper layer can contain a solidified polyurethane dispersion that has a hardness between 45 and 78 Shore A.

A high strength and bendability of the composite material results when the bonding layer prior to being cross-linked contains 50 to 85 wt. % of thermoplastic polyurethane having a crystalline structure and is cross-linked, and/or when the intermediate layer and/or the bonding layer each contain up to 55 wt. %, preferably up to 25 wt. %, of polyacrylates and each have a hardness between 22 and 50 Shore A and/or when the overall thickness of the upper layer and the intermediate layer is 0.11 to 0.22 mm.

The strength and toughness of the upper layer is supported when the upper layer contains between 55 and 95 wt. %, preferably between 65 and 85 wt. %, of a solidified, cross-linked polyurethane dispersion and optionally has a density between 0.9 and 1.12 $g/cm^3$. It is grime-repellent and breathable.

The composite material of the invention is used to produce first and foremost objects in the form of motor vehicle interior wall linings, preferably ceilings, because on account of its very low weight with good tearing strength and all its comfort attributes less $CO_2$ builds up than with known materials of comparable strength and thickness. The same holds for footwear linings having low weight and high strength and the best insulating properties.

Especially due to the preferred depositing of the polyurethane dispersion forming the upper layer on a matrix, the surface configuring of the upper layer can be done however is desired by shaping and structurizing the matrix, especially by means of laser; a plurality of structures can be imparted to the surface of the upper layer, for example, patterns such as logos and brands can be formed on the surface of the upper layer.

The joining of the individual layers of the composite material is exceptionally good, so that even under the influence of solvents, such as gasoline, no separation of layers occurs.

Furthermore, the composite material of the invention is breathable. By forming of continuous capillaries in the upper layer, the composite materials of the invention can be made vapor and/or air permeable. The upper layer can be made with continuous capillaries, which are formed directly during its manufacture, so that the capillaries penetrate the upper layer and optionally the intermediate layer and end in the open cells of the foam. A subsequent adding of capillaries by microperforation is also possible.

A composite material according to the invention has exceptionally good heat and cold insulating action, based on the air in the open-cell polyurethane foam of the substrate.

A composite material according to the invention can be compared to leather and have the appearance of genuine grain leather or suede leather, but without the disadvantages of leather, which is too heavy and costly to be used as car ceilings, since it is at least 6 times heavier than a car ceiling according to the invention.

BRIEF DESCRIPTION OF THE SEVERAL VIEWS OF THE DRAWING

The invention shall be explained more closely hereafter by means of the drawing.

DESCRIPTION OF THE INVENTION

Figure 1:
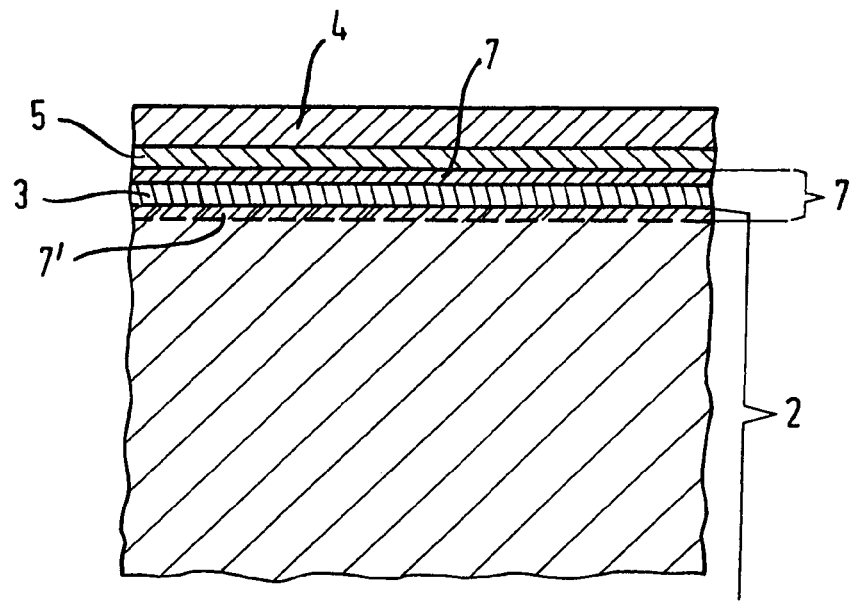
FIG. 1 shows a section through a sample embodiment of a composite material according to the invention with an inlay of a woven or nonwoven fabric or netting.
Figure 2:
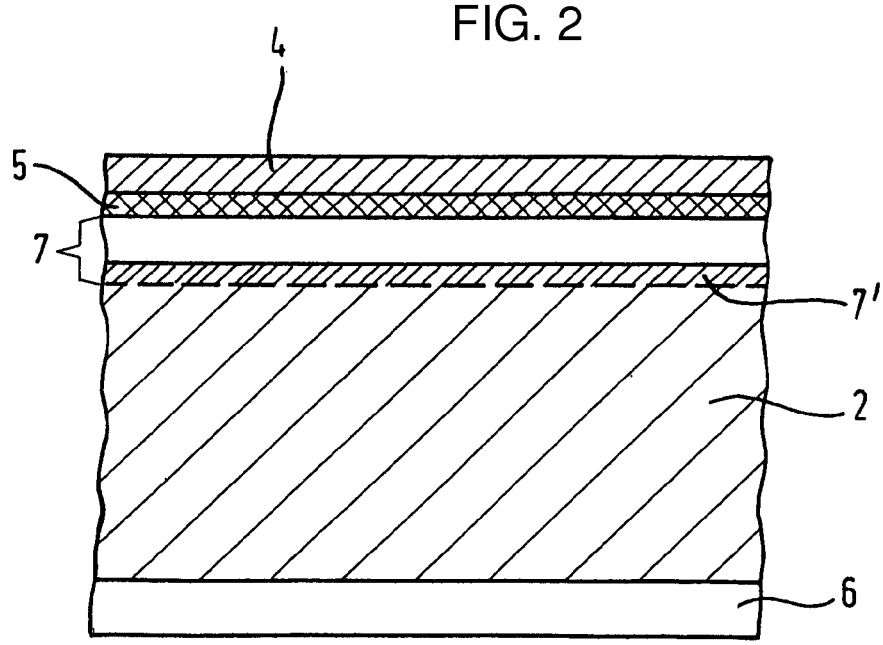
FIG. 2 shows a section through a composite material according to the invention without an inlay of a woven fabric or netting.

The composite material of the invention comprises, per FIG. 1, a number of layers. The upper layer 4 contains the solidified aqueous polyurethane dispersion and is joined by means of an intermediate layer 5, which constitutes the joining of the upper layer 4 to a bonding layer 7. The bonding layer 7 performing the function of an adhesive layer is partially penetrated into a surface region 7' of a substrate 2, whereupon the bonding layer 7 forms the joint between the substrate 2 and the upper layer 4 and the intermediate layer 5. The substrate 2 is formed by an open-cell polyurethane foam. At the lower surface of the substrate 2, another substrate material 6 or a backing layer can be bonded on, at least to improve the insulation and/or strength, especially by means of an adhesive containing a polyurethane dispersion or by flame lamination, as shown in FIG. 2.

By 3 is designated a ply of a netting, nonwoven or woven fabric, which can be bonded onto the surface of the open-cell polyurethane foam 2 and/or embedded in the bonding layer 7. The inlaying of such a netting or woven or nonwoven fabric 3 is done especially when the weight of the open-cell polyurethane foam is less than 45 kg/m$^3$. Advantageously, the weight of the polyurethane foam can be 15 to 110 kg per m$^3$. The netting, nonwoven or woven fabric serves as reinforcement for lightweight foams.

As is evident from the drawing, the adhesive layer 7 penetrates only into a narrow partial region of the substrate 2 or does not even penetrate into the substrate 2, but instead is only bound to the netting, nonwoven or woven fabric 3 and/or to the surface of the substrate 2. The extent of the penetration into the substrate 2 depends mainly on the openings in the netting, nonwoven or woven fabric 3.

In order to create a coated flexible composite material with good air permeability, one proceeds for example as follows:

On a silicone rubber underlayment, whose surface has in the negative at 40× magnification a predetermined structure, such as the structure of fine-cell ground rubber or plastic, heating is done to +95°. An aqueous dispersion containing 41 wt. % polyurethane as the solid fraction is sprayed onto the warm surface to form the upper layer 4. The dispersion is sprayed in a quantity of 158 g/m$^2$ and fine capillaries are formed upon evaporation of the water. Onto this dry, first, still around 60° C. upper layer 4, a further aqueous dispersion is sprayed to form the intermediate layer 5, containing a solid fraction of 45 wt. % to 55 wt. % of a thermoplastic polyurethane, and this in a quantity of 110 g/m$^2$. Although some very fine capillaries of the upper layer 4 are closed in this process, the great majority of the capillaries with lesser diameter are preserved. Next, onto the surface of the substrate 2 and the netting, nonwoven or woven fabric 3 optionally placed thereupon or optionally bonded thereto an aqueous dispersion containing polyurethane as the bonding layer 7 with the same or similar makeup as was used for the intermediate layer 5 is sprayed in a quantity of 95 g/m$^2$ in the form of very small droplets or a mist. After this, the substrate 2 with the still moist dispersion as bonding layer 7 is brought together with the intermediate layer 5, which is still on the matrix, and subjected to a pressure of at most 0.25 kg/cm$^2$ in a roller press, after which it is dried by means of heat. The layers possess continuous capillaries and have good air permeability. According to the invention, the capillaries of the upper layer 4 and/or the intermediate layer 5 end in the open cells of the substrate 2, which are coated with the adhesive and remain open, because the polyurethane dispersions of the intermediate layer 5 and the bonding layer 7 used as adhesive contain around 50% water, which after drying makes the cells smaller in the penetration area but does not close them.

According to the invention, a netting, nonwoven or woven fabric 3 can be put in place or bonded on prior to placing the bonding layer 7 on the substrate 2. After putting in place and bonding the netting, nonwoven or woven fabric 3, the bonding layer 7 is placed on this assemblage, optionally impregnates the netting, nonwoven or woven fabric 3, and penetrates at least into surface regions 7' of the substrate 2. In this way, one ultimately gets a flexible composite material in which a ply of a netting, nonwoven or woven fabric 3 is placed on a substrate 2 formed from an open-cell polyurethane foam and directly bonded to the substrate 2, e.g., by flame lamination, and/or also by means of the bonding layer 7.

According to FIG. 1, a substrate 2 formed from an open-cell polyurethane foam is bonded to an upper layer 4, constituting an exterior, surface-structurized layer containing a solidified polyurethane dispersion, and joined to an underlying intermediate layer 5, preferably containing a solidified polyurethane dispersion having a linear structure. The upper layer 4 and the intermediate layer 5 are firmly joined to each other and bound to the substrate 2 with the bonding layer 7. The bonding layer 7 has penetrated into the open-cell polyurethane foam; this penetration region is indicated as 7'. The bonding layer 7 and the intermediate layer 5 are joined firmly adhering to each other or cross-linked.

A backing layer 6 can be attached to the bottom surface of the substrate 2. The backing layer 6 can be made from paper, cardboard, nonwoven fabric, an adhesive film, plastic film, or other sheetlike materials or those preshaped as a car ceiling, for example.

The netting or woven material 3 advantageously has a basis weight between 15 and 120 $g/m^2$, preferably between 30 and 80 $g/m^2$, and advantageously a thickness of 0.10 to 0.48 mm.

FIG. 2 shows a sectional view of a composite material according to the invention without the inlaying of a netting, nonwoven or woven fabric 3. In this embodiment, the bonding layer 7 is applied directly to the surface of the open-cell polyurethane foam, which constitutes the substrate 2, and has built up in it across the narrow penetration region 7'. By the bonding layer 7, the substrate 2 is firmly bonded to the intermediate layer 5.

Figure 3:
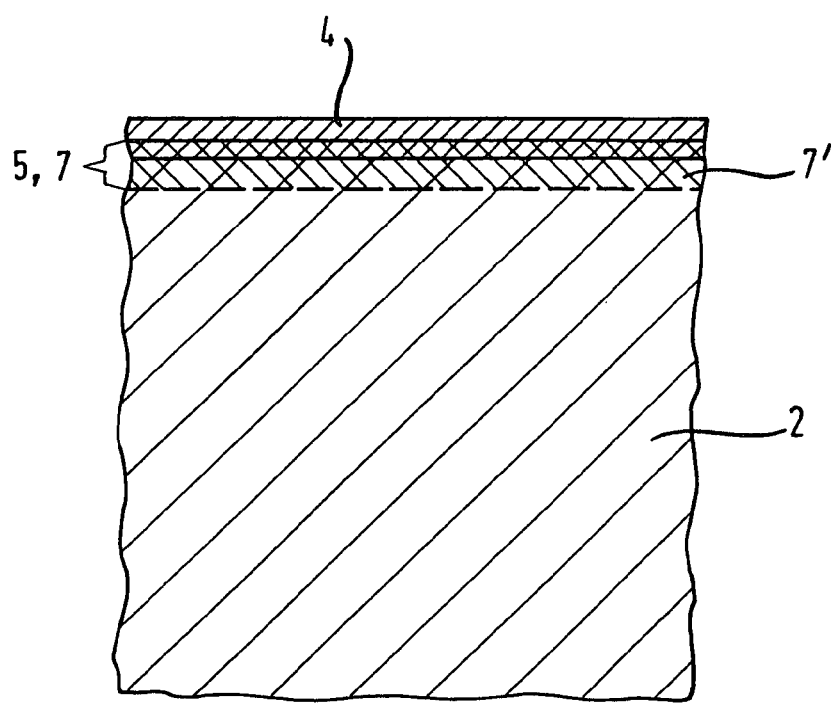
FIG. 3 shows one possible embodiment of the invention.

The upper layer 4 has a hardness of 45 to 78 Shore A with a thickness of 0.06 to 0.12 mm. The intermediate layer 4" has a thickness of 0.05 to 0.9 mm with a hardness of 22 to 50 Shore A. This also holds when the bonding layer 7 is missing and layer 5 is the adhesive layer. It is important here to make only one layer out of adhesive material. The intermediate layer 5 can also act in place of the bonding layer 7, as shown in FIG. 3.

The bonding layer 7 can penetrate around 0.02 to 0.8 mm into the open-cell polyurethane foam. To assure a good bonding between the bonding layer 7 and the polyurethane foam 2, while having a light composite material at the same time, one uses polyurethane foams in which the fraction of open pores is more than 90%.

The polyurethane foam can be based on polyester or polyether and has a thickness of around 1 to 5 mm and is fire retardant.

Advantageously, for a weight of the polyurethane foam of more than 45 $kg/m^3$, the adhesive layer 7 is applied directly to the foam surface without the intermediate laying of a netting, nonwoven or woven fabric 3 and it then penetrates up to 0.8 mm into the open cells of the surface of the polyurethane foam and is chemically bonded and mechanically anchored in the cells, leading to an inseparable connection.

The adhesive mass penetrating into the surface of the polyurethane foam 2 increases the density in this region by at least 12%, preferably by at least 18%.

Insofar as a netting, nonwoven or woven fabric 3 is introduced into the composite material, the composite material obtains a higher weight or a higher density on its top side due to the netting, nonwoven or woven fabric and the flame lamination. It can be provided that the adhesive mass of the bonding layer 7 passes through the netting, nonwoven or woven fabric 3 and upon filling up the interstices of the netting, nonwoven or woven fabric 3 makes contact with the polyurethane foam or also penetrates into it for a certain slight predetermined depth.

A two-ply makeup per FIG. 3 will be used preferably when a coated paper is used in place of a matrix to produce large-format composite materials.

Thus, the coating can be two or three layers.

When the bonding layer 7 placed on the substrate 2 is missing, the intermediate layer 5 is correspondingly thicker, because in this case the quantity of dispersion that would have been placed on the substrate 2 is added to the intermediate layer 5. The thickness of the intermediate layer 5 in this case is 0.06 to 0.15 mm. The intermediate layer 5 or the bonding layer 7 is penetrated in a region 7' of the substrate 2.

Regardless of how many layers make up the composite material, it is easy to maintain, prevents dry and wet dirt from getting into the car ceiling, and is breathable and compression-elastic and very light. One square meter of car ceiling with a thickness of 2.0 mm weighs at most 0.270 kg, preferably less than 0.190 kg.

In place of a matrix, one can also use a surface-structurized paper coated with silicone or, e.g., polypropylene (for larger sheets or web formats).

In this case, it is expedient for the intermediate layer 5 to act as the adhesive layer, because then the polyurethane foam can be placed directly in the still wet intermediate layer 5, situated on the upper layer 4, and pressed lightly with a roller, using a pressure between 0.002 and 0.25 kg $cm^2$. The depth of penetration can be controlled in terms of the quantity of the wet intermediate layer 5 and the pressure and the density of the substrate 2, regardless of whether the adhesive is applied partly to the substrate 2 or only to the upper layer 4. In any case, the layers are brought together wet or moist and slightly pressed. After this, the water is removed from the dispersions by means of heat, which is easy in the case of an open-cell foam, because the water is soaked up like a sponge and can escape through the back side of the open-cell foam.

Figure 4:
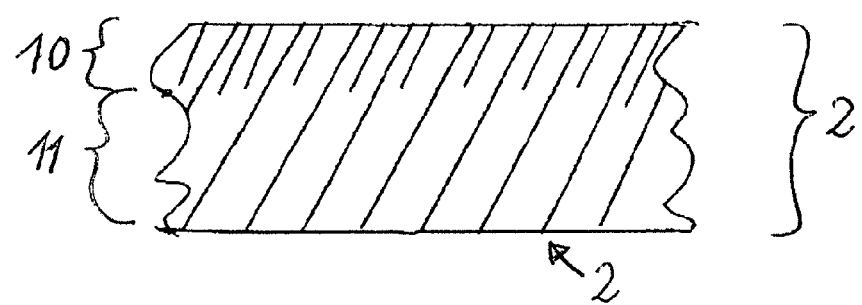
FIG. 4 shows a detail section through the substrate, in which a polyurethane dispersion has been integrated superficially.

In a preferred embodiment of the invention, as shown in FIG. 4, a cross-linked polyurethane dispersion can be integrated in the surface region of the substrate 2 that is near the upper layer 4 and formed by a soft polyurethane foam. This polyurethane layer is applied or introduced with a depth of penetration of 0.02 to 0.8 mm onto or into the substrate 2 before it is joined by means of the adhesive layer to the upper layer 4 and causes a density increase of 12 to 48%, preferably 18 to 30%, in terms of the density value of the regions 11 of the substrate 2 that are free of dispersion.

Both the substrate 2 and the introduced polyurethane dispersion have the properties of elastomers and roughly the same or very similar hardness.

The upper layer 4 can also contain a polyurethane dispersion in this case, having elastomer properties without cross-linking agents and optionally containing more than 2 wt. %, preferably more than 4 wt. % of polysiloxane. The soft intermediate layer 5 and/or bonding layer 7 lying beneath the upper layer 4 consist of a cross-linked dispersion containing polyurethane and likewise have elastomer properties.

It is noted that by elastomer properties is meant that the overall coating is compression and tension-elastic. The intermediate layer 5 and the bonding layer 7 are thermoplastic or thermoelastic before their cross-linking and elastomeric after their cross-linking, even when they contain between 25 and 55 wt. % polyacrylates—as can be provided. Thus, the upper layer 4 is an elastomer layer with a Shore A hardness of 45 to 78 and optionally a polysiloxane fraction of 2 to 12 wt. %. The middle layer or adhesive layer, i.e., the bonding layer 7 and/or the intermediate layer 5 can each contain between 25 and 55 wt. % polyacrylates and are cross-linked and have a Shore A hardness between 22 and 50 and possess the properties of elastomers.

The upper layer 4 is advantageously cross-linked and has pronounced elastomer properties. The layers 5 and 7 can, but need not contain polyacrylate. Without polyacrylate content, they are likewise elastomeric after their cross-linking. With polyacrylate content, depending on the acrylate fraction, they are thermoelastic to elastomeric after their cross-linking, but absolutely no longer thermoplastic.

The polyurethane foam of the substrate 2 has excellent elastomeric properties. This ensures that the upper layer 4 and the substrate 2 have pronounced elastomeric properties and the layers 5 and 7 are thermoelastic to elastomeric. Consequently, the composite material has characteristic elastomeric properties. After a compressive and/or a tensile deformation, the composite material always returns to its starting position.

According to the invention, the unique properties of the composite material result because all layers have elastomeric properties and because all layers have the same or similar hardness.

The upper layer 4 advantageously contains 65 to 85 wt. % of a polyurethane dispersion with elastomeric properties and also optionally additives, especially cross-linking agents, polysiloxanes, pigments and/or thickeners.

To determine the indicated Shore A hardness of the upper layer 4, a test specimen is prepared from the particular batch formulation by repeated spraying and drying to produce the test specimen of 100×100 mm with a thickness of 6 mm. After keeping for 48 hours, the Shore A hardness as set forth in ISO 7619 is determined. The same holds for determining the Shore A hardness of the intermediate layer 5 and/or the bonding layer 7. For determining the Shore A hardness of the substrate 2, a non-foamed test specimen is prepared from the reaction mixture and likewise tested.

A test specimen prepared from the particular reaction mixture to make the foam of the substrate 2, without foaming and tested as described above, with a thickness of 6 mm, has a hardness of 22 to 78 Shore A.

By polyacrylate dispersions is meant thermoplastic, slightly sticky dispersions that have a Shore A hardness of less than 20.

By capillaries is meant passages through all layers deposited on the substrate 2.

By polysiloxanes is meant silicone compounds which impart hydrophobic properties to the upper layer 4 and therefore also have a certain separating action, which however is greatly outweighed by the adhesive properties of the polyurethane dispersions of the individual layers, especially also because the layers are joined wet or moist and the cross-linking agent acts across all layers.

The depth of penetration of the polyurethane layer deposited on the substrate 2 before depositing the layer structure of the layers intended for the upper layer 4 can be between 0.02 and 1.0 mm. The density increase of the regions 11 of the substrate 2 provided with a penetrated polyurethane layer and an integrated polyurethane layer is advantageously between 70 and 95% in terms of the regions of the substrate 2 that are free of dispersion. The polyurethane layer integrated in the substrate 2 is a solidified elastomer dispersion that is cross-linked and reinforces the walls of the open-cell foam of the substrate 2, without closing up the cells of the substrate 2. This reinforcement, what is more, has the benefit that peeled foams based on aromatic polyester or polyether are little discolored if at all by the influence of light in the region of the reinforcement.

The intermediate layer 5 or the bonding layer 7 are each formed from a cross-linked polyurethane dispersion, which was thermoplastic or thermoelastic prior to its cross-linking. Cross-linking means that all layers have elastomeric properties thereafter.

It is important for the open-cell foam of the substrate 2 to have the same or similar hardness to the solidified and cross-linked polyurethane dispersions of the upper layer 4, the intermediate layer 7 and the bonding layer 5, because then no creases are formed upon bending, since all polymer layers have the same or very similar elastic compression and tension behavior.

Since such a light and open-cell foam of the substrate 2 has a very slight crack propagation strength and can be reversibly pressed together with slight pressure, this drawback is surprisingly eliminated by integrating the additional polyurethane dispersion layer in the region near the upper layer 4, which is penetrated or integrated into the surface region.

Not only does this improve the compressive strength, crack strength, and crack propagation strength, but also the visual appearance and feel. The appearance of the surface remains unchanged when stretched up to 50%.

When producing the composite material, the upper layer 4 already has elastomer properties before the cross-linking and the bonding layer 7 and the intermediate layer 5 do so after the cross-linking and the substrate 2 always has them.

Optimization of the make-up and the properties of the composite material is accomplished by the combination of the polyurethanes of different chemical construction with similar elastomeric properties and similar or identical hardness.

It is to be noted that a cross-linking agent contained in the intermediate layer 5 and/or in the bonding layer 7 acts across all layers. Such an overarching action sets in when one of the layers 5 and/or 7 still wet or moist is brought together with the upper layer 4 and the respective layers still contain around 10 to 50 wt. % water and/or when the upper layer 4, dry to the touch, still contains 2 to 8 wt. % water. In this case, the cross-linking agent acts across all layers, which produces an improved connection of the layers when joined by placing next to each other or bringing them together, possibly under pressing.

An example of a composite material produced according to the invention shall be indicated hereafter, and its making explained further.

On a polyurethane peeled foam for the substrate 2 with a basis weight of 180 g/m$^2$, 2 mm thick, a dispersion containing polyurethane and provided with a cross-linking agent is sprayed or deposited such that it penetrates around 1.0 mm into the foam and the peeled foam of the substrate 2 after its drying has a basis weight of 255 g/m$^2$. The dispersion containing solidified and cross-linked polyurethane reinforces the thin cell walls of the open-cell peeled foam of the substrate 2, without altering the foam structure, i.e., the open cell nature. In this way, it is possible to keep in storage prefabricated substrates 2 integrated with polyurethane dispersion and use them as needed for bonding to the upper layer 4 via the adhesive layer. According to the invention, the substrate 2 and the polyurethane dispersion integrated in them can be further impregnated with a welding aid, e.g., a polyvinyl acetate dispersion, so that the composite material can be heat welded, e.g., when used for sun visors.

For further strengthening of the thin cell walls of the peeled foam of the substrate 2, the dispersion containing polyurethane can also contain up to 10 wt. %, in terms of the solidified polyurethane dispersion, of ground or cut textile flocks with a length between 0.01 and 1.8 mm.

By open-cell polyurethane peeled or cleaved foams is also meant those based on polyester or polyurethane in which one or both surfaces have a greater density than the middle region of the foam.

The increased density occurs after the peeling or cleaving due to brief action of heat on one or both foam surfaces and simultaneous exerting of pressure. Thus, e.g., a foam 4 mm thick can be reduced to 2.5 mm with this treatment. The surface densification leads to smaller open cells, but does not produce any air or water-tight skin, as is the case for foams made in molds.

The invention claimed is:

1. A composite material, comprising:
a polymer upper layer formed at least partly from a solidified, polyurethane dispersion, said polymer upper layer having an surface structure produced by drying said polyurethane dispersion on a matrix, said polymer upper layer containing between 2 and 12 wt. % of polysiloxane;
an adhesive layer;
a substrate joined to said polymer upper layer by said adhesive layer, said substrate formed at least partly from an open-cell polyurethane foam, onto which said polymer upper layer, is bonded via said adhesive layer;
said adhesive layer containing an intermediate layer, selected from the group consisting of a single intermediate layer and a double layer being a composite of said single intermediate layer with a bonding layer disposed between said substrate and said single intermediate layer, said intermediate layer disposed between said polymer upper layer and said substrate for joining said polymer upper layer to said substrate;
at least one of said polymer upper layer, said intermediate layer or said bonding layer being formed by a solidified and cross-linked polyurethane dispersion; and
said substrate having first regions into which said solidified and cross-linked polyurethane dispersion of said adhesive layer penetrates in a controlled manner while being deposited have a density that is between 12% and 48% above a density of second regions of said substrate being free of said adhesive layer due to the adhesive layer having penetrated into the first regions thus causing a higher density in the first regions.

2. The composite material according to claim 1,
wherein a fraction of open cells in said open-cell polyurethane foam of said substrate is greater than 90%; and/or
wherein said open-cell polyurethane foam of said substrate is free of skin at least on a surface facing said polymer upper layer; and/or
wherein said open-cell polyurethane foam used for said substrate is a peeled or cleaved foam; and/or
wherein a weight of said open-cell polyurethane foam used in said substrate is 15 to 110 kg/m$^3$; and/or
wherein said substrate has a thickness in a range of 1.0 to 5 mm; and/or
wherein said bonding layer has a basis weight of 20 to 100 g/m$^2$, is a layer of a solidified aqueous polyurethane dispersion, and has a same chemical makeup as said intermediate layer; and/or
further comprising a backing layer bonded onto a surface of said substrate away from said polymer upper layer.

3. The composite material according to claim 1, further comprising:
a netting, a woven fabric or a nonwoven fabric embedded in said intermediate layer or in said bonding layer; and/or
said netting, said woven fabric or said nonwoven fabric is disposed on a surface of said substrate facing said intermediate layer or bonded to said surface of said substrate by flame lamination.

4. The composite material according to claim 3, wherein:
a basis weight of said woven fabric, said nonwoven fabric or said netting is 15 to 120 g/m$^2$; and/or
spacings between threads or yarns of said netting, said woven fabric or said nonwoven fabric or longest dimensions of openings or meshes located between said threads or yarns are 0.02 to 2.5 mm; and/or
said netting, said woven fabric or said nonwoven fabric has a thickness of 0.10 to 0.48 mm.

5. The composite material according to claim 3, wherein:
said netting, said woven fabric or said nonwoven fabric are made from threads or yarns of polyester or polyamide and also a portion of said threads or said yarns are made of cotton fibers; and/or
at least one of said intermediate layer, said bonding layer, said woven fabric, said nonwoven fabric or said netting bonded to said substrate, is one of introduced, penetrated or integrated at least partially penetrating 0.02 to 1.0 mm into said open-cell polyurethane foam of said substrate.

6. The composite material according to claim 1, wherein said polymer upper layer is inseparably joined to said intermediate layer and constitutes a surface structurized, solidified layer containing said polyurethane dispersion.

7. The composite material according to claim 1, wherein:
said solidified polyurethane dispersion of said polymer upper layer contains pigments and has a different polyurethane than said intermediate layer or said bonding layer and is cross-linked; and/or
said polyurethane dispersions for said intermediate layer and said bonding layer are largely identical in their composition or contain up to 55 wt. polyacrylate and are cross-linked.

8. The composite material according to claim 1,
further comprising a hydrophobic finish layer applied to a surface of said polymer upper layer in a thickness of less than 0.005 mm; and/or
wherein said polymer upper layer is a surface-structurized layer containing said solidified, polyurethane dispersion and formed on a structurized matrix or a silicone rubber underlayment or form or on a structurized paper underlayment.

9. The composite material according to claim 1, wherein:
said polymer upper layer contains said solidified polyurethane dispersion and has a hardness between 45 and 78 Shore A; and/or
said bonding layer prior to being cross-linked contains 50 to 85 wt. % of thermoplastic polyurethane having a crystalline structure and is cross-linked with said polymer upper layer; and/or
at least one of said intermediate layer or said bonding layer each contain up to 55 wt. % of polyacrylates and each have a hardness between 22 and 50 Shore A; and/or
said polymer upper layer and said intermediate layer have an overall thickness being 0.12 to 0.25 mm.

10. The composite material according to claim 2, wherein:
at least one of said polymer upper layer, said intermediate layer or said bonding layer has cross-linking agents; and/or
at least one of said polymer upper layer, said intermediate layer or said bonding layer are cross-linked; and/or
said intermediate layer is cross-linked with said bonding layer by joining together in a still moist state; and/or
at least one of said polymer upper layer or said intermediate layer has up to 4 wt. % of transparent plastic hollow microspheres; and/or
said polyurethane dispersions contain at least one of pigments, cross-linking agents or thickeners; and/or said polymer upper layer has fine hairs formed thereon; and/or at least one of said polymer upper layer or said intermediate layer has capillaries or microperforations that are continuous and extend to open pores of said peeled or cleaved foam; and/or said polymer upper layer has a surface with an appearance resembling suede leather, velour, velvet or a ground plastic material with a fine-cell structure or a microfine hexagonal honeycomb structure.

11. The composite material according to claim 1, wherein:
said polymer upper layer has a thickness of 0.04 to 0.14 mm; and/or
said intermediate layer has a thickness of 0.04 to 0.11 mm; and/or
said polymer upper layer contains between 55 and 95 wt. % of a solidified, cross-linked polyurethane dispersion.

12. The composite material according to claim 3, wherein:
said open-cell polyurethane foam of said substrate has a weight of 15 to 45 kg/cm$^3$; and
one of said netting, said woven fabric or said nonwoven fabric is embedded in said bonding layer or bonded to said substrate by flame lamination.

13. The composite material according to claim 1, wherein said substrate is a nonthermoplastic elastomer.

14. The composite material according to claim 1, wherein:
said cross-linked polyurethane dispersion forms a layer and is integrated in a surface region of said substrate facing said polymer upper layer, having a depth of penetration of 0.02 to 1.0 mm, and said polyurethane dispersion of said intermediate layer or said bonding layer has penetrated into said surface region of said substrate in a controlled fashion; and/or
said first regions of said substrate into which said polyurethane dispersion has been integrated and said adhesive layer penetrated in a controlled fashion have a density that is between 30 and 95% above said density of said second regions of said substrate free of adhesive layer; and/or
said polymer upper layer is an elastomer layer with a branched, cross-linked structure; and/or
at least one of said bonding layer or said intermediate layer have elastomer properties; and/or
at least one of said cross-linked polyurethane layer of said intermediate layer or said bonding layer at least one of contain between 25 and 55 wt. polyacrylates or have a Shore A hardness of 22 to 50.

15. The composite material according to claim 1, wherein said polymer upper layer is an elastomeric and cross-linked polymer upper layer (4) with at least one of a Shore A hardness of 45 to 78 or said polysiloxane fraction of 2 to 12 wt. %.

16. The composite material according to claim 8, further comprising:
a negatively structurized underlayment selected from the group consisting of a silicone rubber sheet, a silicone rubber band, and a separation paper, having an appearance of a silk fabric, a carbon fiber fabric, a technical appearance with closely spaced depressions, including with a triangular shape, a square shape, a rectangular shape or a round shape with a depth between 0.002 and 0.01 mm and spacings of 0.001 to 0.005 mm, or that negatively formed structures are created with a laser and/or the surface has the appearance of grain leather.

17. An object, comprising:
a product selected from the group consisting of automobile interior wall linings, car ceilings, luggage trunk linings, door and seat back linings, head rests for automobiles, purses, shaft parts and linings for shoes and sneakers, said product formed from a composite material, said composite material containing:
a polymer upper layer formed at least partly from a solidified, polyurethane dispersion, said polymer upper layer having an surface structure produced by drying said polyurethane dispersion on a matrix, said polymer upper layer containing between 2 and 12 wt. % of polysiloxane;
an adhesive layer;
a substrate joined to said polymer upper layer by said adhesive layer, said substrate formed at least partly from an open-cell polyurethane foam, onto which said polymer upper layer, is bonded with said adhesive layer;
said adhesive layer containing an intermediate layer, selected from the group consisting of a single intermediate layer and a double layer being a composite of said single intermediate layer with a bonding layer disposed between said substrate and said single intermediate layer, said intermediate layer disposed between said polymer upper layer and said substrate for joining said polymer upper layer to said substrate;
at least one of said polymer upper layer, said intermediate layer or said bonding layer being formed by solidified and cross-linked polyurethane dispersion; and
said substrate having first regions into which said solidified and cross-linked polyurethane dispersion of said adhesive layer penetrates in a controlled manner while being deposited have a density that is between 12% and 48% above a density of second regions of said substrate being free of said adhesive layer due to said adhesive layer having penetrated into said first regions thus causing a higher density in said first regions.

* * * * *

UNITED STATES PATENT AND TRADEMARK OFFICE
CERTIFICATE OF CORRECTION

PATENT NO. : 9,475,259 B2
APPLICATION NO. : 13/991287
DATED : October 25, 2016
INVENTOR(S) : Philipp Schaefer It is certified that error appears in the above-identified patent and that said Letters Patent is hereby corrected as shown below:

On the Title Page

(73) Assignee should read: Konrad Hornschuch AG, Weissbach (DE)

Signed and Sealed this
Seventeenth Day of October, 2017

Joseph Matal
*Performing the Functions and Duties of the*
*Under Secretary of Commerce for Intellectual Property and*
*Director of the United States Patent and Trademark Office*